United States Patent [19]

Lalevee, Sr.

[11] Patent Number: 5,025,569

[45] Date of Patent: Jun. 25, 1991

[54] DIP STICK GUIDE, COMBINATION DIP STICK AND DIP STICK HOLDER

[76] Inventor: Russell R. Lalevee, Sr., P.O. Box 338, Chatham, Mass. 02633

[21] Appl. No.: 557,669

[22] Filed: Jul. 24, 1990

[51] Int. Cl.[5] ............................................ G01F 23/04

[52] U.S. Cl. ..................................................... 33/726

[58] Field of Search ................ 15/210 B; 33/722, 726, 33/725, 727, 728, 729, 730, 731

[56] References Cited

U.S. PATENT DOCUMENTS 2,855,682 10/1958 Norgard .
3,591,886 7/1971 Denver .
4,017,935 4/1977 Hernandez .
4,154,105 5/1979 Mackley .
4,155,167 5/1979 DeLano .
4,233,704 11/1980 Sartorio .
4,419,781 12/1983 Meegan .
4,510,690 4/1985 Attler .
4,640,126 2/1987 Jänsch .
4,780,925 11/1988 Sherman .
4,860,401 8/1989 Deveaux .

*Primary Examiner*—Harry N. Haroian
*Attorney, Agent, or Firm*—Thomas A. Kahrl

[57] ABSTRACT

The present invention relates to a guide for attachment to an engine riser tube to guide a dip stick measuring device into the orifice provided in the upper end of the engine riser. The guide provides for controlled entry by the dip stick into the tube by means of a funnel member of spiral conical shape permitting return by one hand only, and to a method for directing a dip stick measuring device and for providing a guide for controlled entry of the dip stick measuring device into a fluid reservoir by manual means wherein the dip stick guide means consists of wires of coiled construction having a funnel member, a tilt wire member and a helical coil attachment member.

13 Claims, 1 Drawing Sheet

DIP STICK GUIDE, COMBINATION DIP STICK AND DIP STICK HOLDER

DESCRIPTION

Background of the Invention

Checking the oil level in automobile crank cases typically has been performed by gasoline service station attendants upon request of an automobile driver, or routinely done and frequently cited as a test of good service by a service station. This task, requires the locating of the dip stick, typically positioned in a tubular holder connected to an engine crank case, the dip stick provided to measure the oil level in the crank case by removal of the dip stick to check the oil level indicated thereon by first wiping the crank case oil from the dip stick with a rag, relocating the tubular holder and reinserting the dip stick in the tubular holder. Typically the tubular riser has a small orifice and due to the small size of the orifice of the holder and its inaccessibility in the engine space typically poorly illuminated, return of the dip stick typically is a two handed operation for the operator, one hand to hold the dip stick handle and the second to hold the oil encased end of the dip stick for insertion into the orifice of the tubular holder. The task exposes the person handling the dip stick to the risk of having their hands and apparel dirtied and stained with oil dropped from the dip stick in the process of handling the oil dip stick withdrawing and reinserting.

Support apparatus for dip sticks are described in various U.S. Patents as follows: U.S. Pat. No. 2,855,682, issued Oct. 14, 1958 directed toward an oil dip stick wiper having two spring arms for movement between a normal position and a wiping Position; U.S. Pat. No. 3,591,886, issued July 13, 1971 directed toward a dip stick wiper attachment consisting of a tubular pliant wiper to be manually squeezed into engagement with the dip stick as its withdrawn from the fluid reservoir; U.S. Pat. No. 4,017,935, issued April 19, 1977 showing a dip stick cleaner for use with a dip stick including a means for attachment of the device to the dip stick tube including a cleaning portion having a slot for receiving the dip stick; U.S. Pat. No. 4,154,105, issued May 15, 1979 which discloses a orientable temperature indicator device for use in monitoring the condition of lubricating oil of motorcycles and recreational vehicles; U.S. Pat. No. 4,155,167, issued May 22, 1979 showing a dip stick guide having a housing with an enlarged funnel mounted in fixed relationship with a tube having a spring loaded movable guide element movable along the longitudinal axis of the funnel; U.S. Pat. No. 4,233,704, issued Nov. 18, 1980 showing an oil dip stick cleaning device having a support to hold and contain a pad of rubber like cleaning material; U.S. Pat. No. 4,419,781, issued Dec. 13, 1983 showing a dip stick wiper apparatus, showing a housing to be attached to a dip stick tube containing a body of wiping material including a slot; U.S. Pat. No. 4,510,690, issued April 16, 1985 showing a dip stick guide for automobile engines having a cylindrical housing including a split seam having a curved funnel-like opening, the split seam being segmented for movement radially outwardly having an elastic rubber sleeve; U.S. Pat. No. 4,640,126, issued Feb. 3, 1987, showing a device for measuring oil levels in internal engines adapted to remain in the oil filling opening of an engine even during filling; U.S. Pat. No. 4,780,925, issued Nov. 1, 1988 showing an attachment for a tube of an engine having a block of resilient material such as foam against which the dip stick is pushed as it is withdrawn from the crank case; U.S. Pat. No. 4,860,401, issued Aug. 29, 1989 disclosing a dip stick wiper having a first and second through passage way. None of the prior art devices suggests to one skilled in the art the novel features of the present invention.

As modern automobiles have become more streamlined with resultant compacting of engine spaces already cramed with pollution control devices, holder tubes for oil and other engine fluid measurement have become more and more inaccessible and more difficult to locate by the user and measuring rods or dip sticks have increased in length and become more difficult to manipulate with the result that use of such rods or dip stick has become more difficult.

Perhaps the most notable development has been the proliferation of self service gas stations, wherein drivers pump their own gas to receive a discount for the gas and as a result do not receive the services of a gas station attendant for services such as measuring of the oil or other engine fluids by means of a dip stick. In such service stations, now, a car owner, man or woman, must personally attend to the checking of fluid levels including oil levels in the crank case, typically in business attire or in expensive casual clothes, neither of which a car operator wishes to spoil with engine dirt and oil in the process of checking for oil by checking for the fluid oil on a dip stick and returning the stick to its normal position.

It is desirable to provide for a new and improved dip stick guide apparatus and method whereby the dip stick guide apparatus is attached to a dip stick holder and the dip stick may be rapidly and accurately moved from an inserted position to a disengaged display position and returned to the inserted position under adverse light conditions, and by means of one handed operation to provide for quick manipulation of the dip stick without soiling the hands or clothes of the operator and to overcome at least some of the disadvantages of the prior art dip stick guide apparatus and methods.

SUMMARY OF THE INVENTION

The invention relates to an improved dip stick guide for controlling use of a dip stick measuring device relative to a dip stick holder for measuring fluid levels in a fluid reservoir and to a method of guiding a dipstick for use relative to a dip stick holder for measuring fluid levels in a reservoir.

An improved dip stick guide apparatus has been discovered for use in combination with a dip stick and dip stick holder, typically of elongated tubual construction applicable to controlling entry of the dip stick during movement of the dip stick between a disengaged display position to an inserted position in the fluid reservoir, such as an internal combustion engine, preferably an automobile engine crank case, and suitable as an aid in locating the dip stick tube and directing the dipstick to the intended position in the wall of the engine or crank case. Typically the dip stick comprises a stick having a one and other end with a handle positioned at the other end for manipulating the dip stick between an inserted position in the fluid reservoir and a disengaged display position for viewing the oil level on the dip stick, the one end being marked to calibrate the oil on the dip stick with the fluid level on the fluid reservoir, the dip stick guide apparatus constructed of coiled wire being attached to the elongated tube of the dip stick holder extending from the crank case for containing the dip stick measuring device; typically the oil dip stick being adapted to measure oil levels in an engine crank case.

The dip stick guide apparatus is used in combination with an elongated hollow tube for enclosing the dip stick and positioning the dip stick in relation to the fluid reservoir, the tube having a one and other end the one end connected to the fluid reservoir and the other end having an orifice characterized by an opening and having an upper circumferential edge. The dip stick also includes a cap attached to the stick to enclose the orifice and prevent escape of oil and vapor-laden droplets of oil from the fluid reservoir and to prevent lowering of the crank case pressure causing engine combustion malfunction.

The guide means for use in providing controlled entry of the dip stick into the dip stick tube, includes a continuous coil of wire having a plurality of concentric coils of increasing diameter having a one and an other end, the coil wire characterized by a narrow opening at the one end and a funnel shaped member at the other end having a plurality of coils, each sequentially larger in diameter, forming a funnel to provide a controlled means for guiding entry of the dip stick, a tilt wire connected to the funnel shaped member and to a center coil member typically containing five coils, engaging the upper portion of the tube for maintaining the tilt wire in vertical alignment with the tube, and a bottom locking helix at the one end for securely attaching the guide means to the dip stick tube adjacent the one end in a position such that the funnel member is positioned over the orifice and spaced therefrom.

In the preferred embodiment the dip stick guide apparatus comprises an oil dip stick for use in an internal combustion engine having a crank case containing oil lubricant, the funnel member preferably is painted with a brightly colored paint for ease of visibility in contrast to the dark interior space of the engine space, the cap of the dip stick is adapted to permit complete seating of the dip stick cap to prevent escape of internal fumes and pressure from the engine from the surrounding engine space, the guide means is constructed of one piece construction for easy assembly onto the tube.

The invention provides a method of directing reentry of a fluid level detecting device, typically a oil dip stick having a one and other end positioned in a dip stick holder connected to a fluid reservoir comprising, providing a guide for controlled entry of the dip stick measuring apparatus into the fluid reservoir, manually grasping the dip stick by means of a handle adjacent the one end for moving the dip stick between an inserted position and a disengaged fluid level indicating position relative to the dip stick holder, withdrawing the dip stick from the inserted position in the reservoir wherein the dip stick is enclosed by the tube of the dip stick holder of elongated tubular construction upwardly extending end having a one and other end for detecting the level of fluid in the reservoir, viewing the fluid level indicated on the dip stick, returning the dip stick to a position adjacent the one end of the tube for reentry of the dip stick into the tube and fluid reservoir, locating the funnel member of the guide means by means of the bright colors making a contrast to its surroundings, directing the one end of the dip stick to the orifice provided in the upwardly extending one end of the tube by means of a guide means attached to the upper portion of the tube, manually moving the dip stick to the fluid level indicating position wherein the dip stick is enclosed by the tube and positioned in the fluid reservoir for detecting fluid levels. In the preferred embodiment the method of manually moving the dip stick may be accomplished with a one hand operation under limited light conditions wherein the return is made quickly and easily with the avoidance of dirtying the other hand of the operator.

The invention will be described for the purposes of illustration only in connection with certain embodiments; however, it is recognized that those persons skilled in the art may make various changes, modifications, improvements and additions on the illustrated embodiments all without departing from the spirit and scope of the invention.

DESCRIPTION OF THE EMBODIMENTS

Figure 1:
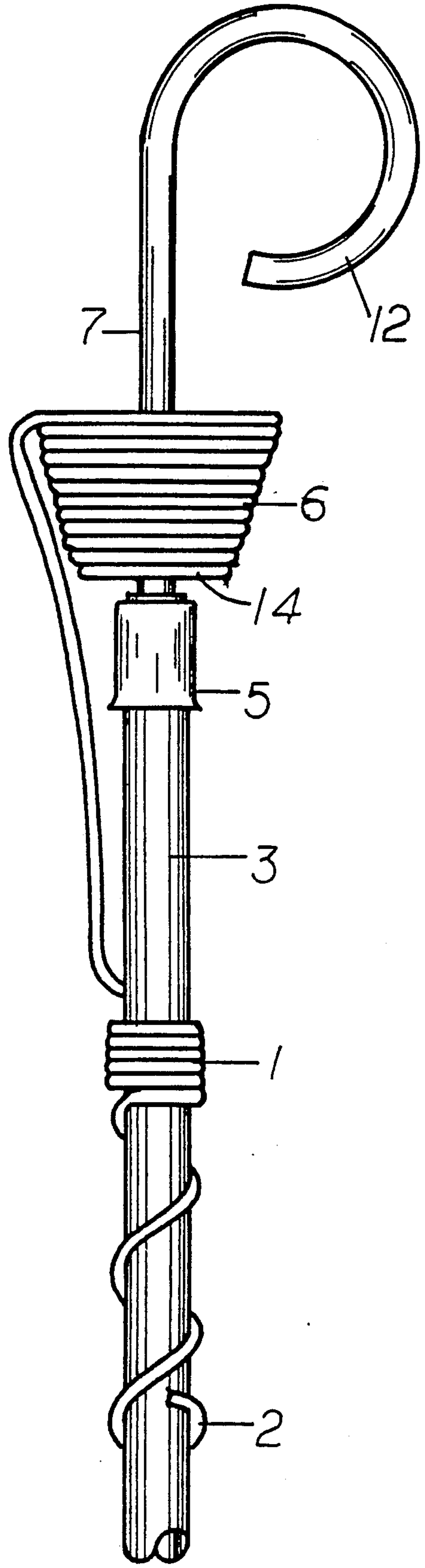
FIG. 1 is a perspective view from the side of the dip stick guide apparatus of the invention, showing the dip stick in the inserted position.

The drawings show a dip stick guide apparatus 10 attached to an elongated hollow tubular dip stick holder 3 adapted to receive a dip stick 7.

The dip stick guide 10 is constructed of a unitary length of rust proof high gloss steel wire, typically forty inches in length having a diameter of 0.150 inches the wire being coiled in three different shapes comprising a helical coil 2 at one end, a funnel member 6 at the other end, connected to a center coil 1 at the mid section by a longitudinally extending straight tilt wire member 4. The center coil 1 supports the funnel member 6 on the hollow tubular holder 3 in an upwardly extending position from an engine crank case not shown, and maintaining the funnel member 6 in a generally vertical coaxial alignment with the holder 3, the funnel member 6 being spaced from a cap 5 positioned on the orifice 11 provided at the upper end of the holder. The tilt wire 4 extending from the center coil 1 to the coil funnel 6 is not coil rather it is straight and permits the funnel 6 to move through an arc of 360 degrees to permit access to the orifice 11 of the tubular holder from a plurality of positions of the dip stick 7.

The dip stick 7 includes a cylindrical cap 5 and a handle 12 The cylindrical cap 5 is adapted for engaging the upper circumferential edge 11 of the dip stick holder 3, the handle 12 extending upwardly from the upper end of the holder 3 to be accessible for a user.

Figure 2:
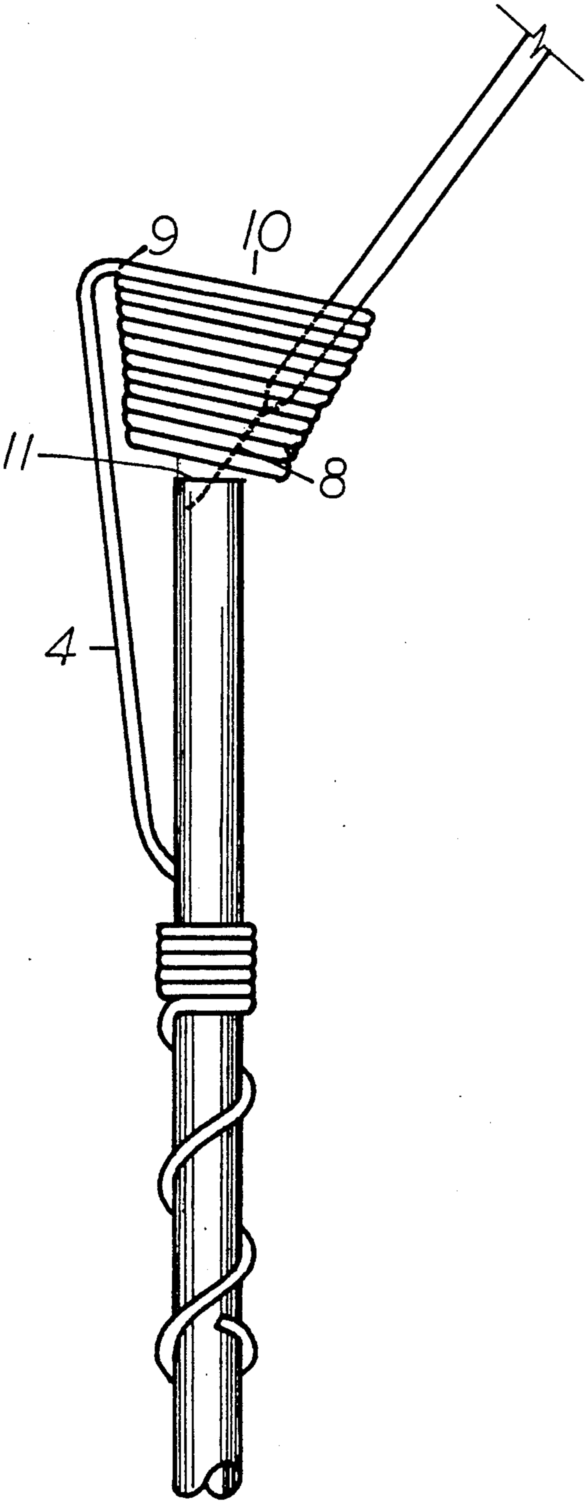
FIG. 2 is a perspective view from the side of the apparatus of FIG. 1 showing the dip stick in the disengaged fluid level indicating position.

The helical coil 2 positioned adjacent the center coil 1 is adapted to be adjustable to attach the dip stick guide 10 by clamping on different diameters of dip stick holders 3. The tilt wire 4 constructed of resilient steel permits the funnel member 6 to be tilted through an angle of 360° having a natural tendency to be returned to its original upright position wherein the funnel member 6 is held in spaced relationship upwardly and from the cap 5 positioned on the holder 3, the inner diameter of the lower end of the funnel member 14 being greater than the cap 5 permitting the cap to be moved from an engaged position on the holder 3 to a disengaged position having passed centrally through the funnel member 6 to permit the dip stick 7 to be disengaged from the holder by manual means as shown in FIG. 2.

What is claimed is:

1. A dip stick guide apparatus for use with a dip stick measuring device adapted to measure fluid levels in a fluid reservoir comprising:

a) a dip stick means to measure fluid levels in the fluid reservoir comprising a stick and having a one and other end and a handle attached to the one end;

b) an elongated hollow tube means for enclosing the dip stick means and for positioning the dip stick means in relation to the fluid reservoir, the tube means having a one and other end the one end connected to the fluid reservoir and the other end having an orifice;

c) a cap means to enclose the orifice and to prevent escape of vapor laden with droplets of fluid from the fluid reservoir;

d) a guide means for controlled entry of the dip stick into the tube means constructed of resilient wire comprising:

i) a continuous coil wire having a plurality of concentric coils of increasing diameter having a one end and an other end characterized by a narrow opening at the one end and an open layered funnel shaped opening having coils sequentially larger in diameter and forming a funnel to provide controlled entry of the dip stick;

ii) a center coil;

iii) a tilt wire connected to the upper funnel and to the center coil supporting the guide operations and maintaining the tilt wire in vertical alignment with the tube means;

iv) a bottom locking helix means to attach the guide means to the tube means adjacent the other end.

2. The dip stick guide apparatus of claim 1 wherein said cap means includes a cap for positioning on the stick for movable attachment to the other end of the tube means for enclosing the orifice.

3. The dip stick guide apparatus of claim 2 wherein the guide means is characterized by a space between the funnel and the tube means permitting the dip stick to pass through the space upon entry of the stick into the tube means.

4. The dip stick guide apparatus of claim 2 wherein the fluid reservoir is an internal combustion engine crank case containing engine oil.

5. The dip stick guide apparatus of claim 1 wherein the dip stick has a one and other end including a handle for manipulating the dip stick between an inserted position in the fluid reservoir and to an disengaged fluid level indicating position for viewing the oil level on the dip stick, the other end being marked to calibrate the oil on the dip stick with the fluid level on the fluid reservoir.

6. The dip stick guide apparatus of claim 1 wherein the continuous coil is constructed of a flexible material permitting bending of the guide means.

7. The dip stick guide apparatus of claim 1 wherein the guide means is brightly colored for ease of visibility.

8. The dip stick guide apparatus of claim 1 wherein the guide means permits a complete seating of the dip stick engine cap means to prevent escape of internal fumes and pressure.

9. The dip stick guide apparatus of claim 1 wherein the guide means is constructed of one piece construction for easy assembly.

10. The dip stick guide apparatus of claim 1 wherein said guide means provides a means to return the engine dip stick easily and quickly into the tube means under adverse light conditions and a one hand operation.

11. The dip stick guide apparatus of claim 1 wherein the helix coil locks the dip stick guide means to the tube means.

12. In combination the dip stick guide apparatus of claim 1 attached to the dip stick means adapted to measure fluid levels in a fluid reservoir.

13. A dip stick guide apparatus for use with a riser tube comprising:

a) a guide means for controlled entry of the dip stick into the riser tube constructed of resilient wire comprising:

i) a continuous coil wire having a plurality of concentric coils of increasing diameter having a one and an other end characterized by a narrow opening at the one end and an open layered funnel shaped opening having coils sequentially larger in diameter and forming a funnel to provide controlled entry of the dip stick;

ii) a center coil;

iii) a tilt wire connected to the upper funnel and to the center coil supporting the guide operations and maintaining the tilt wire in vertical alignment with the riser tube;

iv) a bottom locking helix means to attach the guide means to the riser tube adjacent the other end.

* * * * *